J. P. DERANEK.
PISTON PACKING RING.
APPLICATION FILED APR. 18, 1918.
1,340,650.
Patented May 18, 1920.
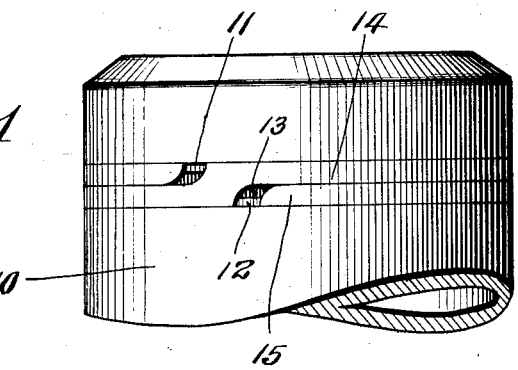
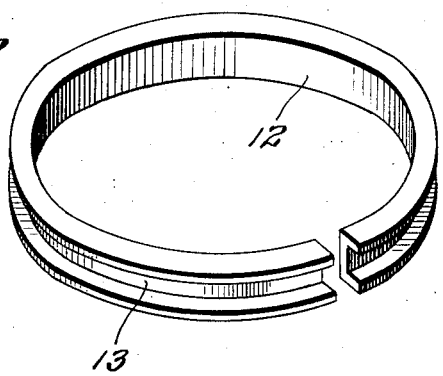
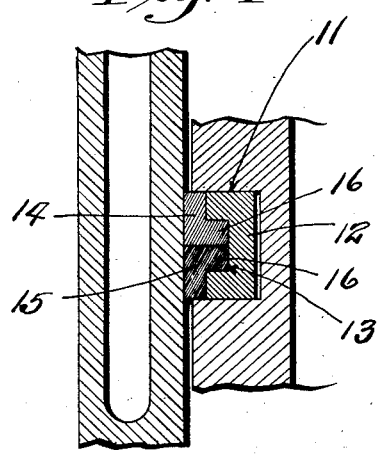
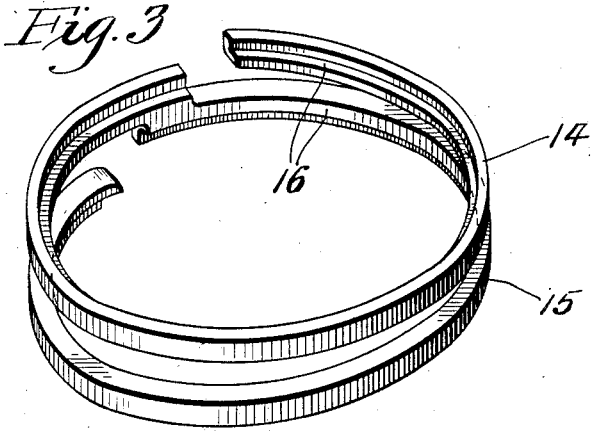
Inventor
Joseph P. Deranek

UNITED STATES PATENT OFFICE.

JOSEPH P. DERANEK, OF EAST ST. LOUIS, ILLINOIS.

PISTON PACKING-RING.

1,340,650.     Specification of Letters Patent.     Patented May 18, 1920.

Application filed April 18, 1918. Serial No. 229,297.

*To all whom it may concern:*

Be it known that I, JOSEPH P. DERANEK, a citizen of the United States, residing at East St. Louis, Illinois, have invented a certain new and useful Improvement in Piston Packing-Rings, of which the following is a full, clear, and exact description, such as will enable others skilled in the art to which it appertains to make and use the same, reference being had to the accompanying drawings, forming part of this specification.

My invention relates to a metal packing ring particularly designed for use upon the pistons of all forms of engines, pumps and the like, for the purpose of producing a tight joint between the piston and wall of the cylinder in which said piston operates, thereby overcoming the leakage of gas, oil and the like past the piston in either direction, and consequently obtaining a maximum degree of efficiency from the piston while the same is in service.

Further objects of my invention are, to provide a piston packing ring which has a relatively high degree of resiliency so that it will at all times maintain a leak-proof joint between the piston and the wall of the cylinder without producing undue frictional resistance against the cylinder wall; further, to provide a packing ring having a normal tendency to expand equally in all directions, thereby automatically adjusting itself in contact with the inner face of the cylinder wall and which provision minimizes any wear which may occur between the outer face of the piston ring and cylinder wall; and further, to provide a packing ring which can be easily and cheaply manufactured and readily applied for use upon a piston or the like.

With the foregoing and other objects in view, my invention consists in certain novel features of construction and arrangement of parts, hereinafter more fully described and claimed and illustrated in the accompanying drawings, in which—

Figure 1 is an elevational view of a piston to which is applied a packing ring of my improved construction.

Fig. 2 is a perspective view of the inner or base member of the packing ring.

Fig. 3 is a perspective view of the outer member of the ring.

Fig. 4 is an enlarged detail section of a portion of a piston and cylinder and showing a ring of my improved construction seated in said piston.

Referring by numerals to the accompanying drawings which illustrate a practical embodiment of my invention, 10 designates a piston in which is formed a circumferentially arranged packing ring groove 11. The inner or base member of my improved packing is in the form of an open or split ring 12, preferably constructed of relatively soft metal, such as cast iron, and having a certain degree of resiliency. This ring is of uniform width and thickness throughout its length and formed in its outer face is a groove or channel 13 of uniform width and depth.

The outer member of my improved packing is formed in a single piece, preferably from cast iron, or metal having a certain degree of resiliency, and said member is composed of two open or split rings 14 and 15, the same being connected to each other so that said rings overlap each other throughout their length. Thus said outer member is in the form of a spiral having two complete coils or rings with a short section of the end of one coil or ring overlapping a short portion of the end of the other coil or ring so that the bodies of the coils or rings occupy substantially parallel planes when the outer member is in position upon the inner or base ring. It will be understood that this outer member is integrally formed or constructed from a single piece of material. Thus the ring 14 lies immediately above the ring 15 and one end of said upright upper ring 14 is formed integral with one end of the lower ring 15. The upper ring 14 is substantially L-shape in cross section while the lower ring 15 is substantially of inverted L-shape in cross section.

The horizontally disposed flanges 16 of the two rings are inwardly presented and when the outer member thus formed is applied to the base member or ring 12, said inwardly presented flanges occupy and fit snugly within the groove or channel 13.

The outer vertical portions of the rings 14 and 15 combine to form an outer divided member, which is equal in width to the width of the inner ring or member 12, and thus when said outer member is properly associated with the inner member 12 and these associated parts are applied to the groove 11 in the piston, said members fit snugly within all of said groove, as seen in Fig. 4.

Normally, the rings 14 and 15 are separated from each other a slight distance as illustrated in Fig. 3, and when said members are brought together and applied to the inner member 12, the resiliency of the metal forming the outer member tends to cause the rings 14 and 15 to spread apart, thereby forcing the upper and lower faces of the inwardly presented flanges 16 into intimate contact with the corresponding faces of the groove or channel 13, thereby forming tight joints between the inner member and the parts forming the outer member.

It will be understood that when a piston equipped with my improved packing is inserted in the cylinder, it is necessary that the packing members be contracted until the outer faces of the rings 14 and 15 lie flush with the outer face of piston 10, and this action necessarily creates tension in the two members forming the packing so that after the piston has been properly positioned in the cylinder, this tension tends to cause the parts of the packing to expand with the result that relatively tight joints are produced between the inner and outer members and between the outer members and the wall of the cylinder with the result that the leakage of gas, oil or the like past the piston packing is overcome.

By virtue of the fact that the outer member of the packing is formed of two rings connected to each other at one end only, the tendency of said rings is to expand uniformly in all directions, and as a result, the wear between the packing ring and the inner face of the cylinder wall is reduced to a minimum and likewise, the outer member of the packing will automatically adjust itself to any irregularities in the face of the cylinder which may occur as a result of wear or as a result of imperfect boring at the time of manufacture.

It will be understood that when the two parts of the packing are assembled, the point of connection between the rings 14 and 15 is positioned directly opposite the split or opening in the inner member or ring 12, and such arrangement necessarily enhances the tendency of the packing ring to expand uniformly in all directions.

A packing ring of my improved construction is comparatively simple, can be easily and cheaply manufactured, and provides efficient means for maintaining a leak-proof joint between a piston and cylinder, and consequently materially increasing the efficiency of the piston during operation.

It will be readily understood that minor changes in the size, form and construction of the various parts of my improved piston packing ring may be made and substituted for those herein shown and described, without departing from the spirit of my invention, the scope of which is set forth in the appended claims.

I claim:

1. A packing ring comprising an expansible open base ring provided in its outer face with a groove, and an expansible member encircling said base ring, said expansible member being constructed from a single piece of resilient metal in the form of a spiral having two coils or rings and each coil or ring having an inwardly projecting portion which occupies the groove in the base ring when said expansible member and base ring are assembled.

2. The combination with an expansible open base ring provided in its outer face with a groove, of an expansible member encircling said base ring, said expansible member being constructed from a single piece of resilient metal in the form of a spiral having two coils or rings, the upper end of which is L-shape in cross section, the lower coil or ring being of inverted L-shape in cross section, and the inwardly projecting portions of said coils or rings being positioned within the groove in the base ring when said expansible member and base ring are assembled.

In testimony whereof I hereunto affix my signature this fifteenth day of April, 1918.

JOSEPH P. DERANEK.